United States Patent [19]
Ward et al.

[11] Patent Number: 5,489,114
[45] Date of Patent: Feb. 6, 1996

[54] TIE ROD EXTENDABLE AND RETRACTABLE TELESCOPIC AXLE ASSEMBLY

[75] Inventors: Wayne L. Ward, Greencastle; Robert D. Backer, Rouzerville; Jeffrey L. Spidel, St. Thomas; Donald C. Hade, Jr., Waynesboro, all of Pa.

[73] Assignee: Kidde Industries, Inc., Iselin, N.J.

[21] Appl. No.: 314,763

[22] Filed: Sep. 29, 1994

[51] Int. Cl.[6] .............................. B60B 35/10; B62D 7/20; B62D 49/06
[52] U.S. Cl. .......................... 280/638; 180/155; 180/159; 180/163; 180/209; 180/906; 280/95.1
[58] Field of Search ................................ 180/906, 900, 180/9.48, 209, 340, 155, 159, 163; 280/638, 95.1

[56] References Cited

U.S. PATENT DOCUMENTS

| | | | |
|---|---|---|---|
| 1,967,283 | 7/1934 | Brown | 180/209 |
| 2,099,194 | 11/1937 | Brown | 180/340 |
| 3,894,598 | 7/1975 | Yeou | 180/9.48 |
| 4,039,094 | 8/1977 | Grove | 180/906 |
| 5,282,644 | 2/1994 | Larson | 280/638 |

*Primary Examiner*—Mitchell J. Hill
*Attorney, Agent, or Firm*—Brady, O'Boyle & Gates

[57] ABSTRACT

A tie rod extendable and retractable telescopic axle assembly wherein a pair of axle beams are slidably mounted in a box beam integral with a vehicle chassis. Steering linkage and associated wheel assemblies are mounted on the outer ends of the axle beams, and the inner ends of the axle beam within the box beam are telescopically mounted relative to each other which provides an increased wheel base when the axle beam are moved outwardly of the box beam. A hydraulic cylinder and piston rod assembly is mounted between the box beam and wheel assemblies so that the hydraulic cylinder and rod assembly function not only as an actuator for extending and retracting the axle beams but also as a tie rod for the wheel assemblies.

9 Claims, 10 Drawing Sheets

TIE ROD EXTENDABLE AND RETRACTABLE TELESCOPIC AXLE ASSEMBLY

BACKGROUND OF THE INVENTION

In order to increase the stability of mobile aerial work platforms or cranes during operation at a job site, it has been proposed to provide the vehicle wheels with extendable axles so that the wheels can be placed at relatively great distances transversely of the vehicle chassis to thereby increase the vehicle wheel base, the axles also being retractable toward the chassis during transit or for negotiating narrow passageways.

Heretofore, these extendable and retractable axle systems included a pair of axle beams slidably mounted in each end of a box beam integral with the vehicle chassis, the wheels and associated steering linkages being mounted on the outer ends of the axle beams. A hydraulic cylinder is operatively connected to the axle beams for sliding the beams relative to the box beam and at least one transversely extending, extensible tie rod is operatively connected to the steering linkage for each wheel. These types of extendable and retractable axle systems are disclosed in U.S. Pat. Nos. 4,039,094, dated Aug. 2, 1977; and 4,449,600, dated May 22, 1984.

While these conventional extendable and retractable axle systems have been satisfactory for their intended purpose, they have been characterized by certain disadvantages in that the extent to which the wheel base can be increased is limited by the arrangement of slidably mounting an axle beam in each end of the box beam. The extensible tie rods have to be manually pinned after the axle beams have been extended and retracted, and the hydraulic cylinder for actuating the axle beams is usually separate from the tie rod. These conventional systems require time to deploy in that the tie rod pins have to be manually set.

After considerable research and experimentation the extendable and retractable axle system of the present invention has been devised to provide a wider wheel base than heretofore provided in conventional extendable and retractable axle systems, and the hydraulic cylinder for extending and retracting the axle beams also functions as a tie rod, whereby fewer parts are employed for more quickly deploying the system than conventional systems.

SUMMARY OF THE INVENTION

The tie rod extendable and retractable telescopic axle assembly of the present invention comprises, essentially, a box beam or housing integral with a vehicle chassis. An axle beam is slidably mounted in each end of the box beam and the inner end portions of the axle beams are positioned in telescoped relationship with each other. The vehicle wheels and associated steering linkages are mounted on the outer ends of the axle beams. The hydraulic cylinder for actuating the axle beams also functions as a tie rod extending between the steering linkages.

DESCRIPTION OF THE PREFERRED EMBODIMENT

Figure 1:
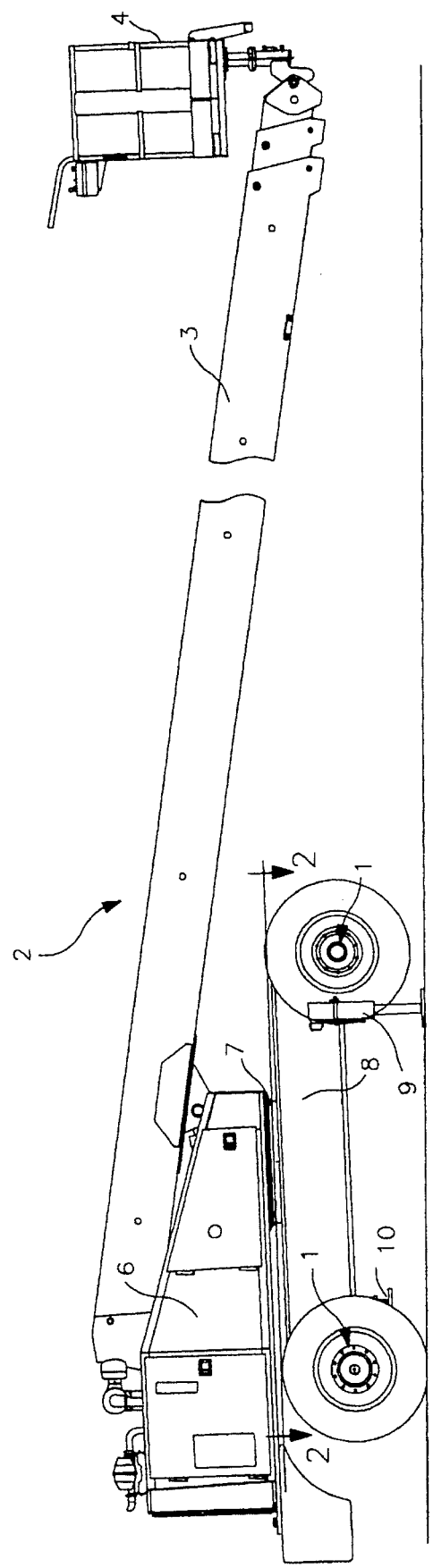
FIG. 1 is a side elevational view of a telescopic boom mobile aerial work platform machine having the tie rod extendable and retractable telescopic axle assembly of the invention on the front and rear thereof, and front and rear jack cylinders for raising the front and rear ends of the machine for extension and retraction of the respective telescopic axle assembly, showing the front jack extended and front axle raised for extension or retraction.

Referring to the drawings in greater detail, and more particularly to FIG. 1, the extendable and retractable telescopic axle assembly 1 of the present invention is shown employed on the front and rear wheels of a mobile aerial work platform 2 including a telescopic boom assembly 3 having a work platform 4 mounted on the outer end thereof with the inner end thereof pivotally connected to a superstructure 6 carried by turntable 7 mounted on the vehicle chassis 8. Hydraulic jacks 9 and 10 are mounted along the center line of the vehicle chassis 8, adjacent the front and rear thereof, for selectively lifting the front or rear axle assembly 1 during the extension or retraction thereof, to be described more fully hereinafter.

Figure 4:
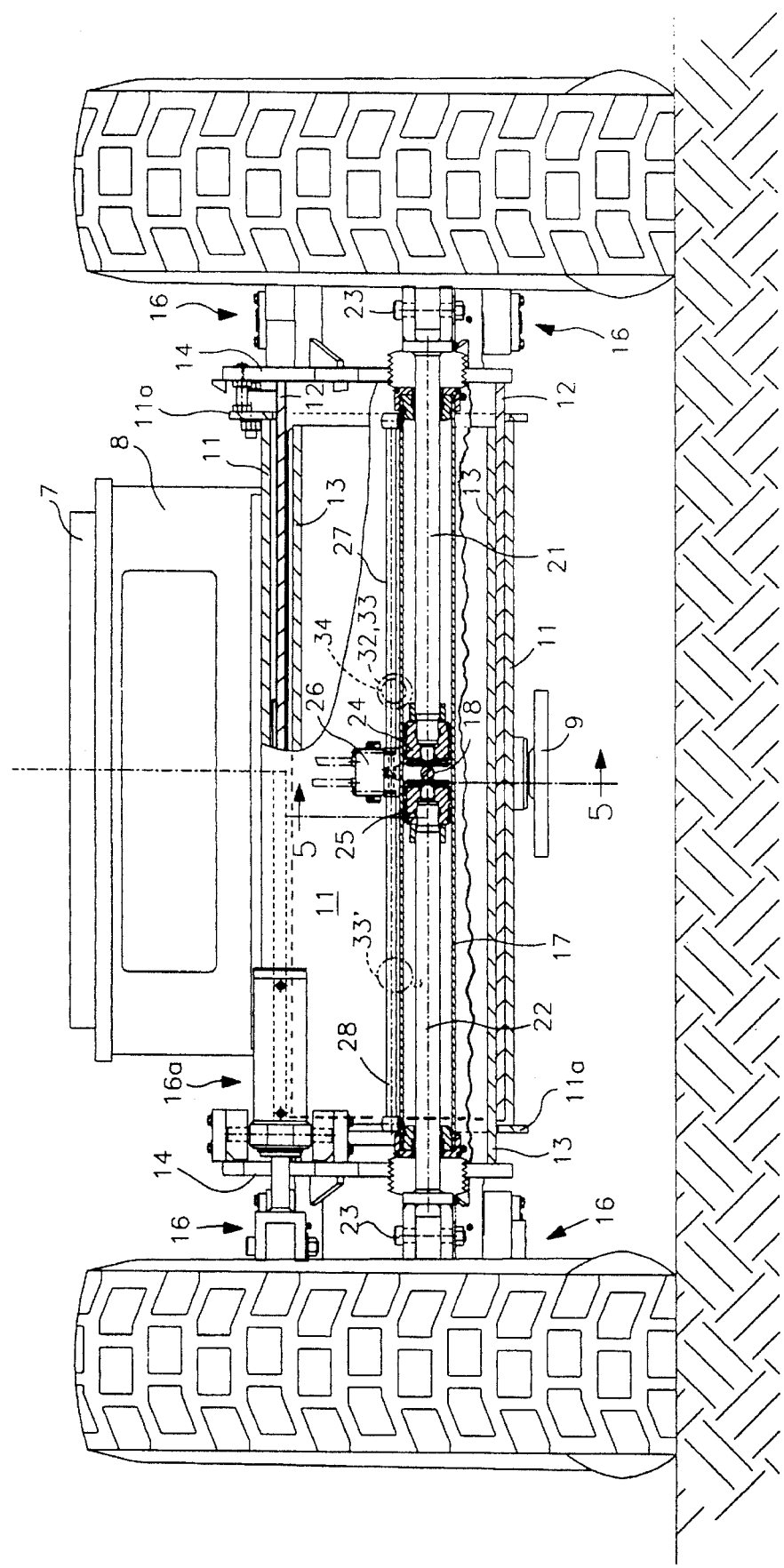
FIG. 4 is a front elevational view, on an enlarged scale, of the tie rod extendable and retractable telescopic axle assembly of the invention in the retracted position, the Figure showing the telescopic tie rod cylinder in longitudinal section, and showing the telescopic axle assembly in fragmentary longitudinal section with parts removed for clarity.
Figure 6:
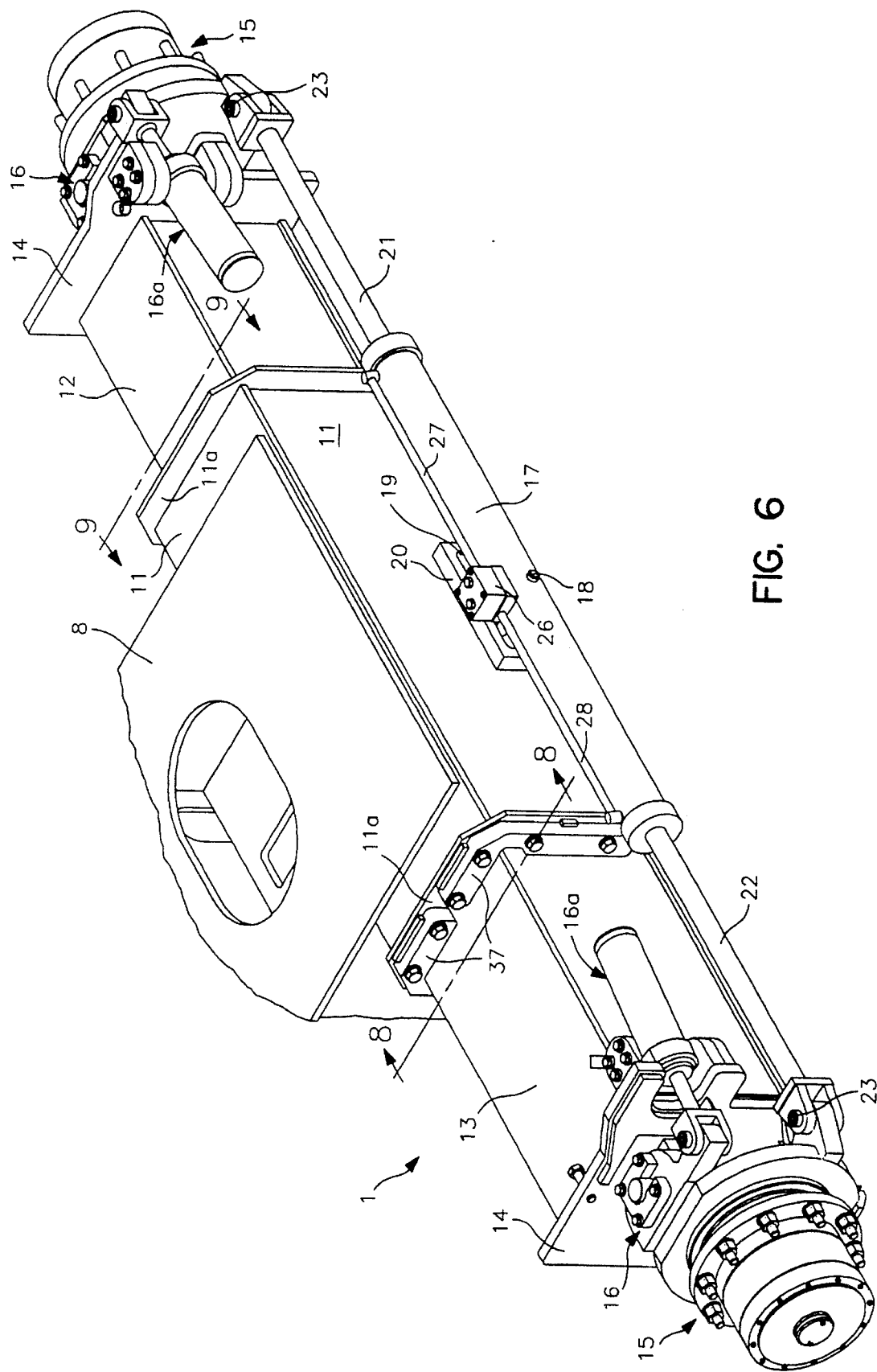
FIG. 6 is a perspective view of the tie rod extendable and retractable telescopic axle assembly of the invention in the extended position.

Referring to FIGS. 4 and 6, since the telescopic axle assembly for each of the front and rear wheels is identical, the axle assembly for the front wheels will be described. A box beam or housing 11 is integral with the vehicle chassis 8, and a pair of axle beams 12 and 13 are slidably mounted in the box beam 11 with the inner end portion of axle beam 13 telescoped within the axle beam 12, so they are telescoped with each other and within box beam 11 substantially throughout their lengths. Plates 14 are secured to the outer end of the axle beams 12 and 13 to which the wheel assemblies 15 and associated steering linkage 16 and steer cylinders 16a are pivotally mounted.

Figure 5:
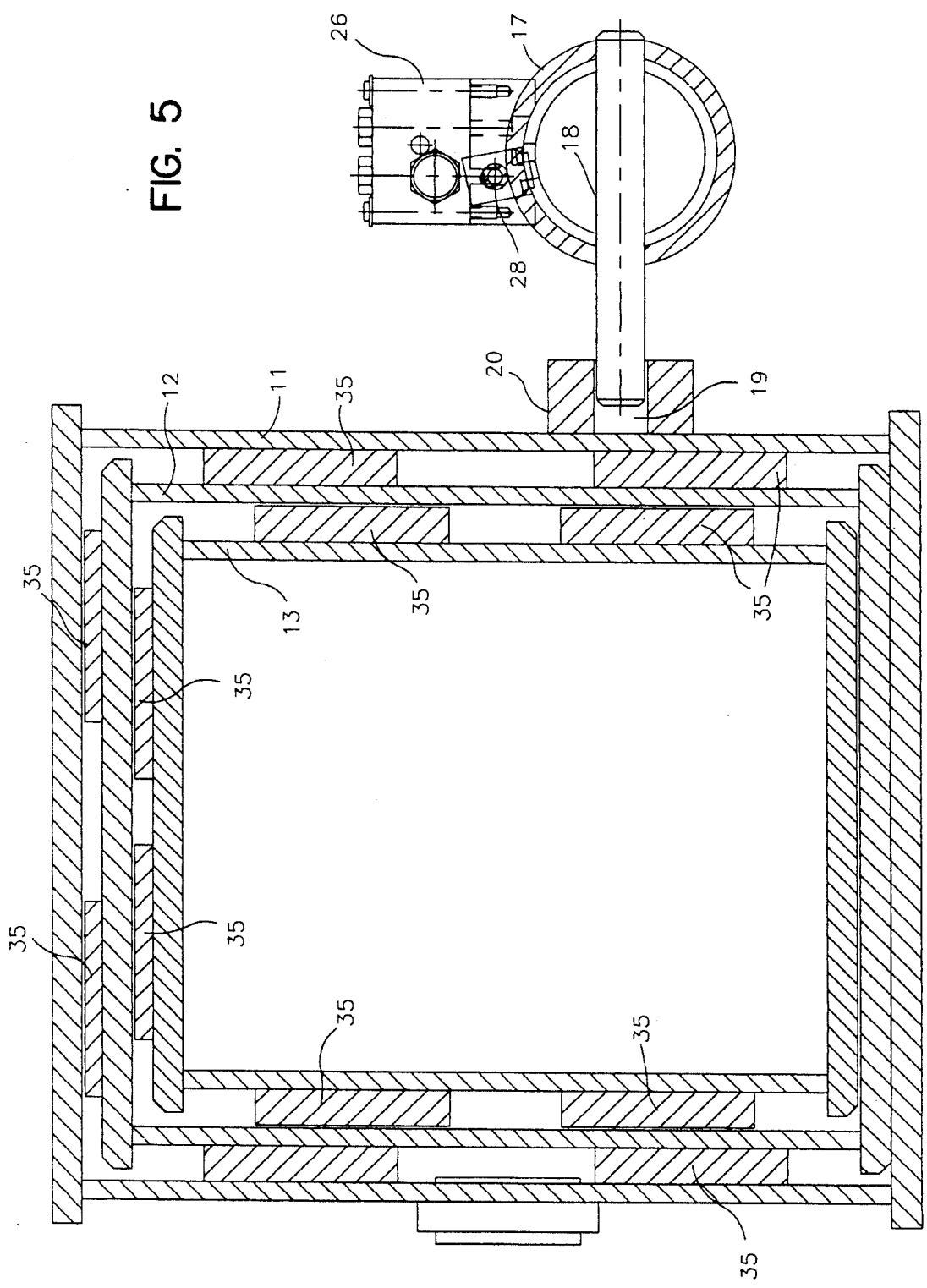
FIG. 5 is an enlarged cross-sectional view taken substantially along line 5—5 of FIG. 4 showing the three sections of the telescopic axle assembly and the connection of the telescopic tie rod to the base section of the telescopic axle assembly.

To extend and retract the axle beams 12 and 13, a hydraulic cylinder 17 is positioned along the side of the box beam 11 and supported thereon by a pin 18 extending therethrough, as shown in FIG. 5, the end of the pin 18 being slidably received in an elongated slot 19 provided in a block 20 integral with the side of the box beam 11. Piston rods 21, 22 are slidably mounted in the cylinder 17 and extend outwardly from each end thereof. The outer ends of each piston road 21, 22 is pivotally connected to a respective steering assembly 16 as at 23. As will be seen in FIGS. 4 and 7, the inner ends of each piston rod 21, 22 has a respective piston 24, 25 mounted thereon. The pistons 24 and 25 are spaced from each other and a hydraulic fluid supply and exhaust fitting 26 communicates with the space between the pistons 24 and 25, and hydraulic pipes 27, 28, connected thereto, communicate with the outer ends of the cylinder 17 on the opposite side of each piston 24 and 25. By this construction and arrangement, when hydraulic fluid is supplied to the space between pistons 24 and 25, the piston rods 21 and 22 are simultaneously moved outwardly together with the beam axles 12 and 13. To retract the piston rods 21 and 22 and associated axle beams, hydraulic fluid is supplied to the outer ends of the cylinder 17 by pipes 27 and 28 to force the pistons 24 and 25 inwardly, while the hydraulic fluid in the space between the pistons is exhausted therefrom.

When in the extended or retracted position, the cylinder pin 18 will slide within the block slot 19 during the steering of the wheels, so that the cylinder 17 and piston rods 21, 22 will move as a unit, to thereby function as a tie rod between the opposite steering linkage 16.

Figure 2:
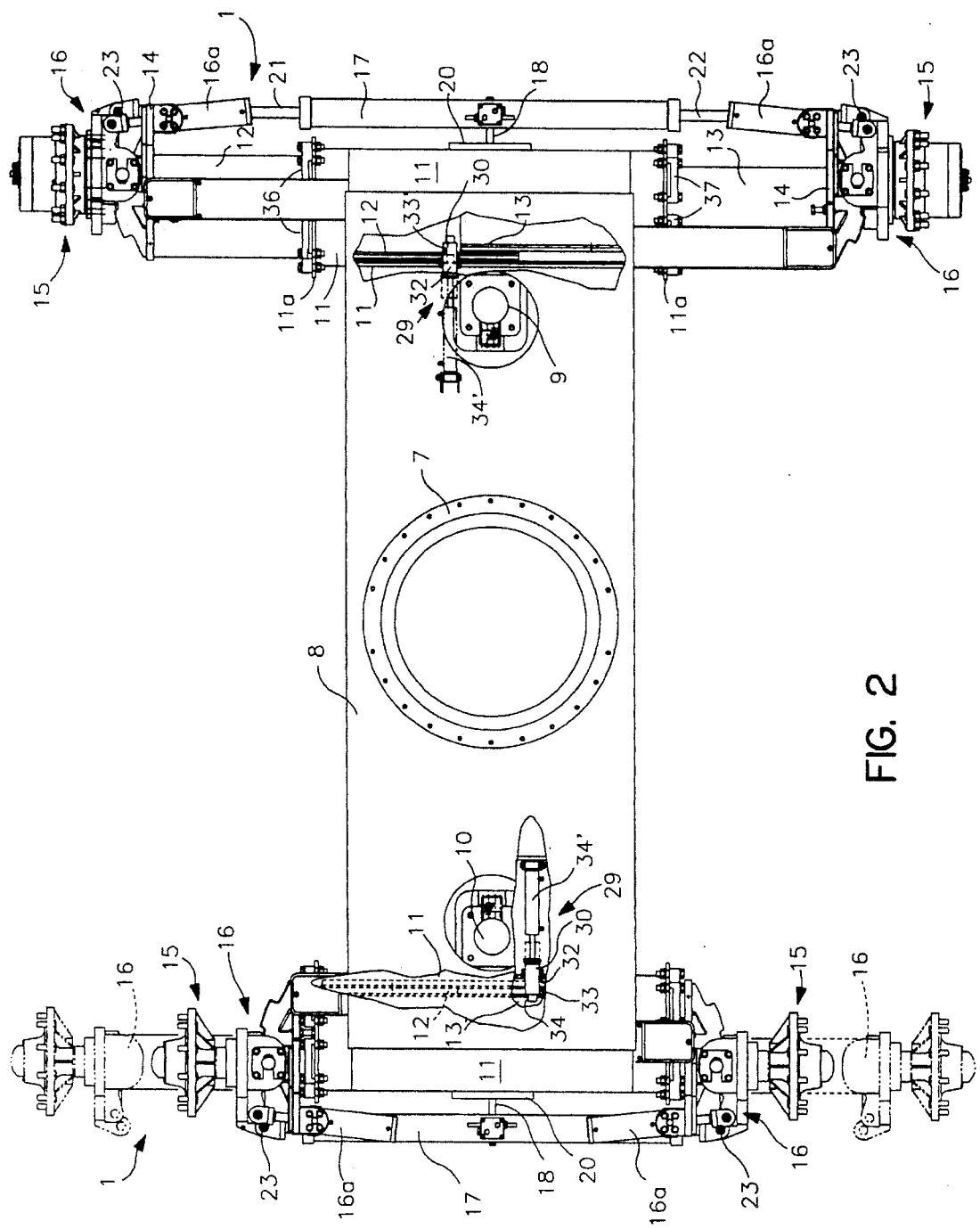
FIG. 2 is a top plan view, partly in fragmentary section, of the chassis of the machine taken substantially along line 2—2 of FIG. 1, with the tires removed for simplification, and showing the front axle assembly in the extended positions in phantom lines.
Figure 3:
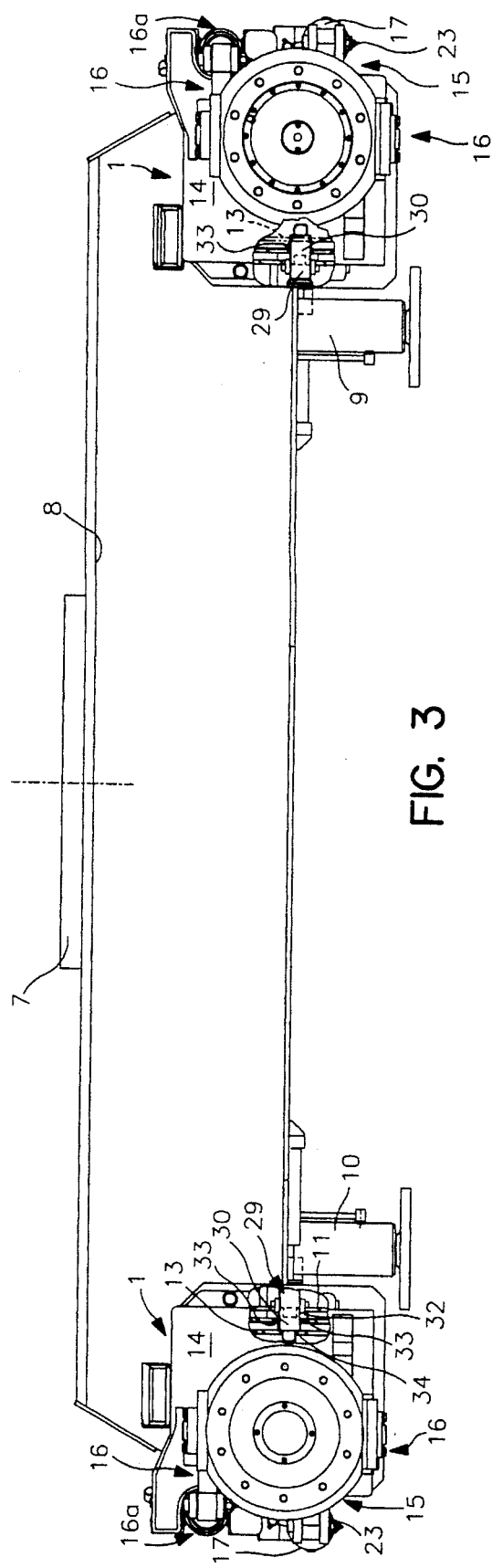
FIG. 3 is a side elevational view of the machine chassis of FIG. 2, showing the front and rear telescopic axle assemblies connected thereon and the front and rear jack cylinders in the retracted positions, the view showing in fragmentary cross-section the lock pin positions in the locked retracted position of the rear axle and the locked extended position of the front axle assembly.
Figure 7:
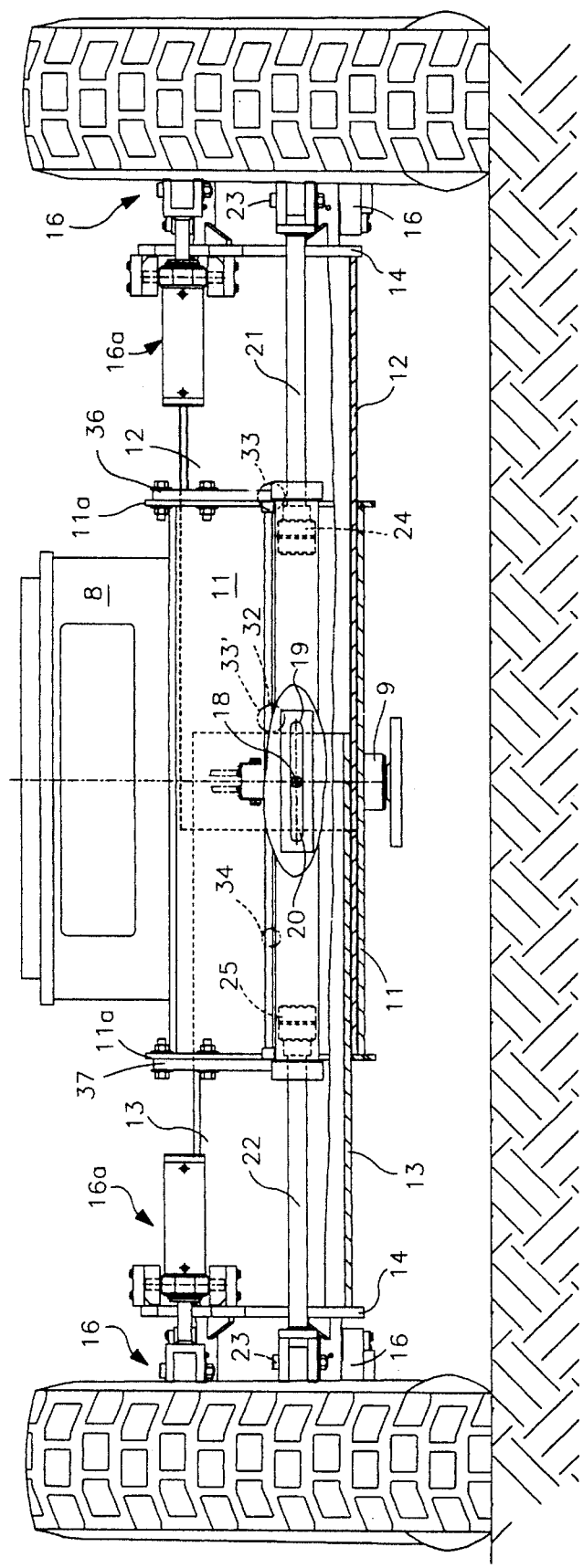
FIG. 7 is a front elevational view, on a reduced scale, of the tie rod extendable and retractable telescopic axle assembly in its extended position, the view being broken away to show the connecting plate for the tie rod assembly in elevation, and the view being partly in fragmentary longitudinal section through the lower portion of the telescopic axle assembly.

In order to automatically connect the telescopic axle beams 12 and 13 in either the extended or retracted position, as will be seen in FIGS. 2 and 3, a detent assembly 29 is provided, and comprises, a spring biased pin 30, biased inwardly toward the box beam 11 and axle beams 12 and 13 and insertable through an aperture 32 in the box beam 11, aperture 33 in axle beam 12, and aperture 34 in axle beam 13, to hold the axle system in the retracted position. When the axle beams 12 and 13 are in the extended position, as shown in FIGS. 2, 6 and 7, the spring biased pin 30 extends through apertures 32 and 33', in the box beam 11 and axle beam 12, respectively, with the end of the pin 30 engaging the end of the axle beam 13. To move the pin 30 to the released position against the spring biasing force, a hydraulic cylinder 34' is connected to the pin 30.

Figure 8:
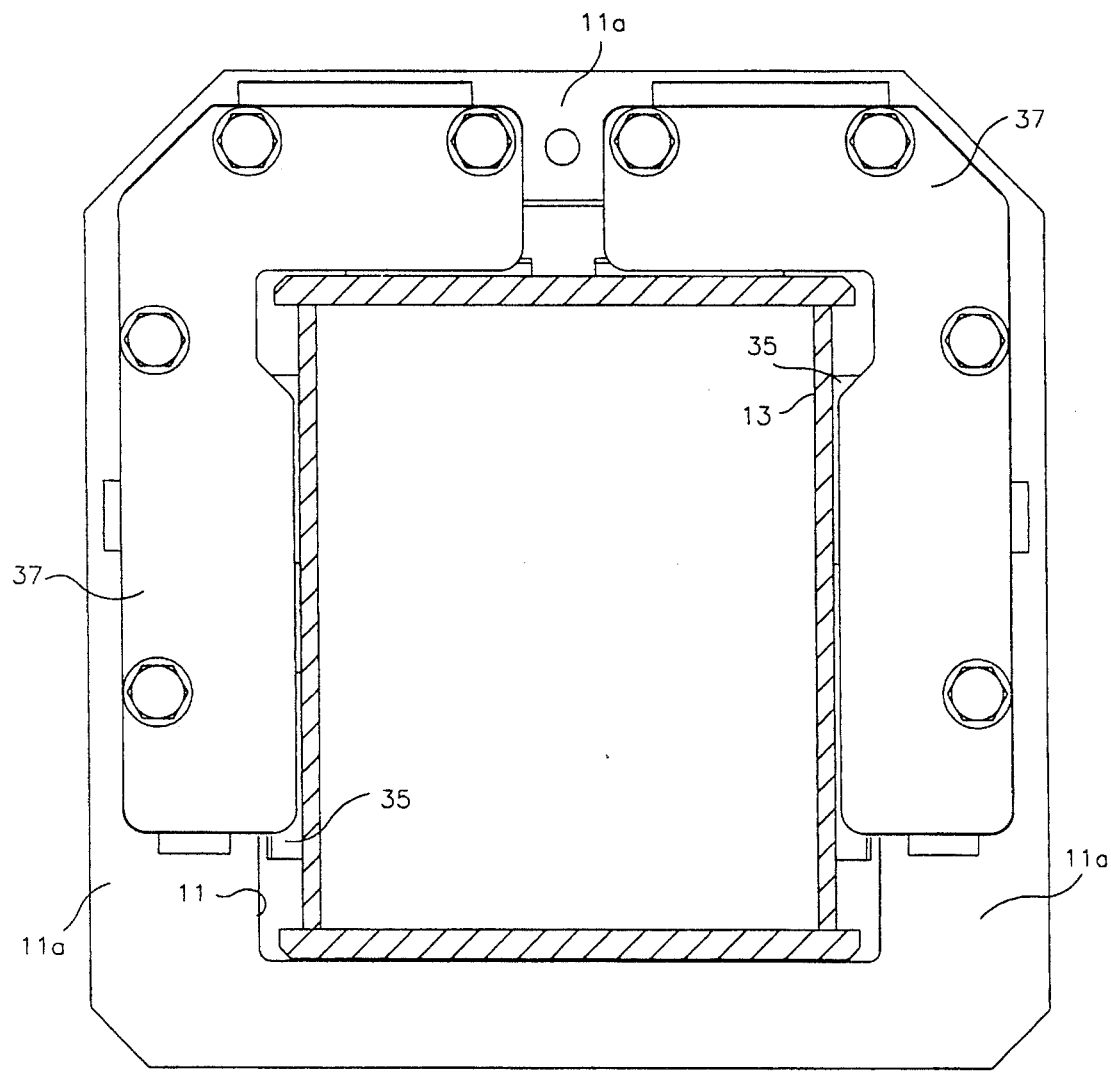
FIG. 8 is an enlarged cross-sectional view taken substantially along line 8—8 of FIG. 6.
Figure 9:
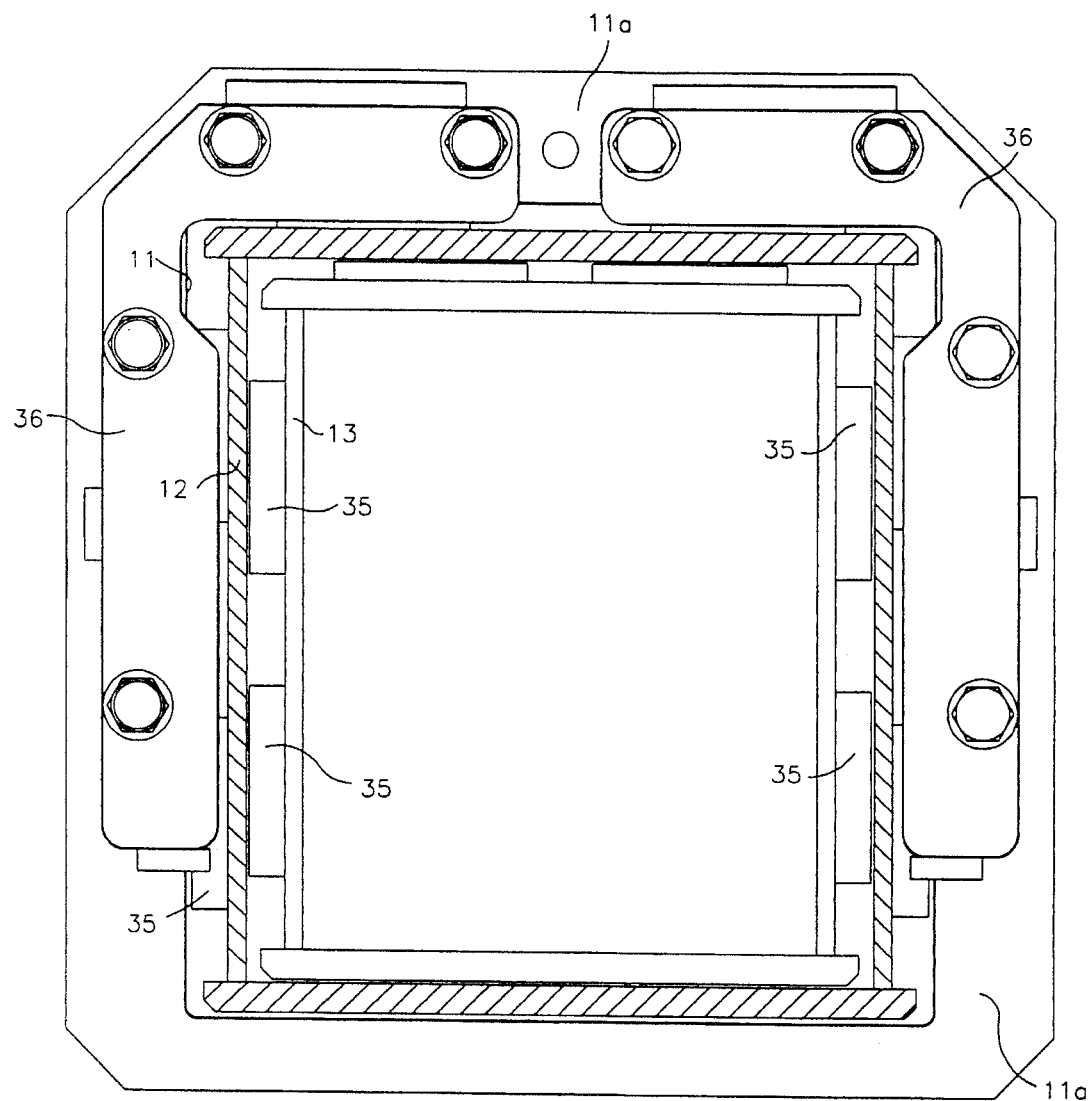
FIG. 9 is an enlarged cross-sectional view taken substantially along line 9—9 of FIG. 6.

To complete the structural description of the telescopic axle assembly, it will be seen in FIG. 5 that bearing strips 35 are mounted in the spaces between the walls of the box beam 11, and axle beams 12 and 13 to facilitate the telescopic movement of the axle beams, and as shown in FIGS. 8 and 9, shim or clearance plates 36 and 37 are bolted to end flanges 11a surrounding the end openings in the box beam 11 through which the axle beams 12 and 13 extend, as shown in FIG. 6, to thereby guide the axle beams 12 and 13 during their telescopic movement.

Figure 10:
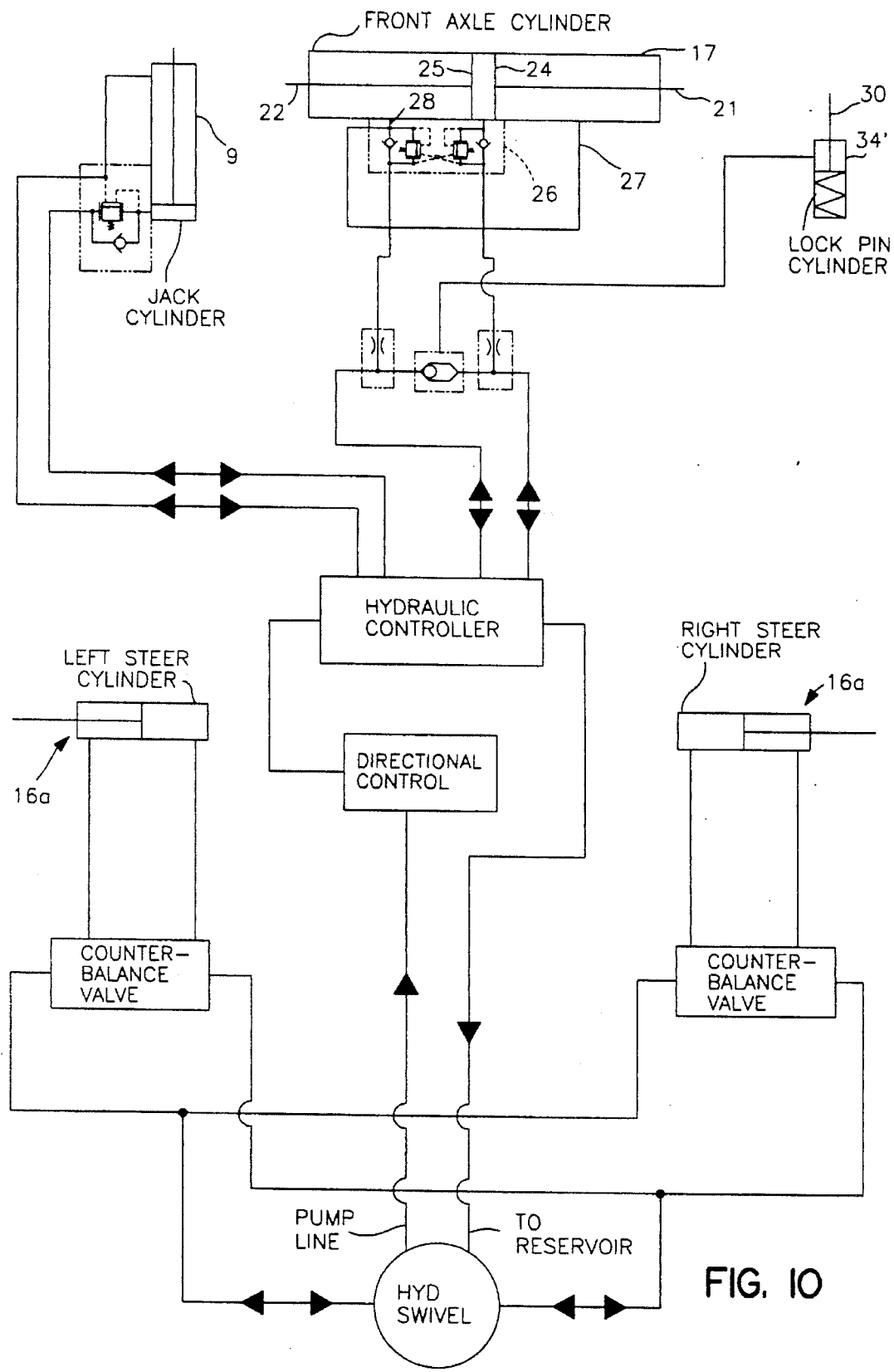
FIG. 10 is a simplified schematic diagram of the hydraulic circuit for controlling the jack cylinder, lock pin cylinder for locking the telescopic axle assembly, tie rod cylinder for extending and retracting the telescopic axle assembly, and left and right steer cylinders, for one of the telescopic axle assemblies of the invention.

FIG. 10 illustrates the hydraulic circuit employed for operating the telescopic axle assembly of the present invention. When it is desired to extend the axle assembly either the jack cylinder 9 or 10 is actuated to lift either the front or rear wheel assemblies, as shown in FIG. 1. The hydraulic cylinder 34' is then actuated to retract the pin 30 from the box beam aperture 32, axle beam aperture 33, and axle beam aperture 34. Hydraulic fluid is then directed in the space between the pistons 24, 25 in the cylinder 17 to extend the piston rods 21, 22 outwardly of each end of the cylinder 17. Since the ends of the piston rods 21, 22 are connected to the wheel assemblies 15 which, in turn, are connected to the steering linkage 16 mounted on the ends of the beam axles 12 and 13, the beam axles 12 and 13 are caused to be moved outwardly from the box beam 11. During this movement, the hydraulic pressure in the lock pin cylinder 34' is reduced so that the pin 30 is spring biased into the obliqued box beam aperture 32 and aperture 33' in axle beam 12, and moves behind the end of axle beam 13, to lock them in the extended position. Hydraulic fluid is also locked in cylinder 17. The hydraulic fluid in the jack cylinder is then exhausted allowing the wheel assemblies to once again engage the ground.

To retract the telescopic axle assembly, the operational steps of extending the jack cylinder 9, and hydraulically retracting the lock pin 30 are repeated, and then hydraulic fluid is directed through pipes 27 and 28 to force the pistons 24 and 25 inwardly of the cylinder 17, while hydraulic fluid is exhausted from the space between the pistons 24 and 25.

The various components employed in the hydraulic circuit, as shown in FIG. 10, are constructed and arranged so that only a sequential operation of the jack cylinder and lock pin can be accomplished before the axle beams 12 and 13 can be actuated.

From the above description it will be appreciated by those skilled in the art that the telescopic axle assembly of the present invention is an improvement over conventional telescopic axle assemblies in that axle beams 12 and 13 are telescopically mounted relative to each other, whereby a wider wheel base is obtainable than afforded by conventional telescopic axle assemblies. For example, the wheel base using the present invention can be extended from approximately eight fee six inches to approximately twelve feet. Furthermore, the cylinder 17 and piston rods 21, 22 not only function as a hydraulic cylinder for extending and retracting the axle beams 12 and 13, but also as a tie rod between the steering linkage 16 when it is hydraulically locked.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

We claim:

1. A tie rod extendable and retractable telescopic axle assembly comprising, a vehicle chassis, an open ended box beam integral with said chassis and extending transversely to the longitudinal axis of said vehicle, a first axle beam having an inner end portion and an outer end portion, said first axle beam being slidably mounted in one open end of said box beam and extending outwardly therefrom, a second axle beam having an inner end portion and an outer end portion, said second axle beam being slidably mounted in the other open end of said box beam and extending outwardly therefrom, the inner end portion of one of said axle beams being telescopically mounted within the inner end portion of the other axle beam, steering linkage mounted on the outer end portions of said first and second axle beams, wheel assemblies mounted on said steering linkage, and hydraulic cylinder means operatively connected between the box beam and said steering linkage, whereby the hydraulic cylinder means functions as an actuator for extending and retracting the first and second axle beams relative to each other and as a tie rod extending between said steering linkage.

2. The telescopic axle assembly according to claim 1, wherein detent means is mounted on the box beam and automatically extendable into the first and second axle beams to lock the first and second axle beams in an extended or retracted position.

3. The telescopic axle assembly according to claim 2, wherein the detent means comprises a slidable pin biased toward the first and second axle beams.

4. The telescopic axle assembly according to claim 3, wherein a hydraulic cylinder is connected to the pin for pulling the pin away from the first and second axle beams.

5. The telescopic axle assembly according to claim 1, wherein the hydraulic cylinder means comprises, a cylinder mounted on said box beam, a pair of oppositely extending piston rods slidably mounted within said cylinder, said piston rods having inner ends and outer ends, the outer ends of said piston rods extending outwardly of said cylinder and connected to said steering linkage, a piston connected to the inner end of each piston rod, each piston having one side and an opposite side, a space between said one sides of said pistons, a source of hydraulic pressure communicating with said space for moving the piston rods simultaneously outwardly of the cylinder, said source of hydraulic pressure communicating with said cylinder on said opposite sides of said pistons for moving the piston rods simultaneously inwardly of the cylinder.

6. The telescopic axle assembly according to claim 1, wherein said axle beams each extend telescopically within said box beam substantially through the length of said box beam in the retracted position of said axle assembly.

7. The telescopic axle assembly according to claim 1, wherein the inner end portion of said one axle beam is telescopically mounted within the inner end portion of the other axle beam in both the retracted and extended positions of said axle beams.

8. A tie rod extendable and retractable telescopic axle assembly comprising, a vehicle chassis, an open ended box beam integral with said chassis and extending transversely to the longitudinal axis of said vehicle, a first axle beam having an inner end portion and an outer end portion, said first axle beam being slidably mounted in one open end of said box beam and extending outwardly therefrom, a second axle beam having an inner end portion and an outer end portion, said second axle beam being slidably mounted in the other open end of said box beam and extending outwardly therefrom, the inner end portions of said first and second axle beams being positioned in telescopic relationship, steering linkage mounted on the outer end portions of said first and second axle beams, wheel assemblies mounted on said steering linkage, a cylinder mount on said box beam, a pair of oppositely extending piston rods slidably mounted within said cylinder, said piston rods having inner ends and outer ends, the outer ends of said piston rods extending outwardly of said cylinder and connected to said steering linkage, a piston connected to the inner end of each piston rod, each piston having one side and an opposite side, a space between said one sides of said pistons, a source of hydraulic pressure communicating with said space for simultaneously extending the piston rods and associated first and second axle beams relative to each other, said source of hydraulic pressure communicating with said cylinder on said opposite sides of said pistons for simultaneously retracting the piston rods and associated first and second axle beams relative to each other, a fixed pin extending transversely through the cylinder into said space, a block provided on a side wall of the box beam, an elongated slot formed in said block, said fixed pin slidable in said slot during movement of the steering linkage, whereby the cylinder and piston rods move as a unit to provide a tie rod for the steering linkage and associated wheel assemblies.

9. A tie rod extendable and retractable telescopic axle assembly comprising, an open ended box beam integral with said chassis and extending transversely to the longitudinal axis of said vehicle, a first axle beam having an inner end portion and an outer end portion, said first axle beam being slidably mounted in one open end of said box beam and extending outwardly therefrom, a second axle beam having an inner end portion and an outer end portion, said second axle beam being slidably mounted in the other open end of said box beam and extending outwardly therefrom, the inner end portion of said second axle beam being substantially coextensively, telescopically mounted within the inner end portion of said first axle beam, steering linkage mounted on the outer end portions of said first and second axle beams, wheel assemblies mounted on said steering linkage, and hydraulic cylinder means operatively connected between the box beam and said steering linkage, whereby the hydraulic cylinder means functions as an actuator for extending and retracting the first and second axle beams relative to each other and as a tie rod extending between said steering linkage.

* * * * *